United States Patent [19]
Wieland

[11] Patent Number: 5,235,912
[45] Date of Patent: Aug. 17, 1993

[54] HOLLOW PAPER GUIDE CYLINDER WITH INTERNAL REINFORCEMENT

[75] Inventor: Erich G. Wieland, Würzburg, Fed. Rep. of Germany

[73] Assignee: Koenig & Bauer Aktiengesellschaft, Wurzburg, Fed. Rep. of Germany

[21] Appl. No.: 897,815

[22] Filed: Jun. 12, 1992

[30] Foreign Application Priority Data

Jun. 15, 1991 [DE] Fed. Rep. of Germany ....... 4119824

[51] Int. Cl.⁵ ............................................. B21B 37/08
[52] U.S. Cl. ................... 101/409; 100/162 B; 492/6
[58] Field of Search ............... 101/216, 232, 246, 375, 101/407.1, 409, 410, 475; 100/155 R, 162 B; 492/2, 5, 6, 7

[56] References Cited

U.S. PATENT DOCUMENTS

| 242,058 | 5/1881 | Schurmann | 100/162 B |
| 2,048,005 | 7/1936 | Horton | 100/162 B |
| 3,161,125 | 12/1964 | Hornbostel | 100/155 R |
| 4,438,695 | 3/1984 | Maier et al. | 101/375 |
| 4,487,122 | 12/1984 | George et al. | 100/62 B |

FOREIGN PATENT DOCUMENTS

| 3005690 | 2/1980 | Fed. Rep. of Germany . |
| 3823846 | 7/1988 | Fed. Rep. of Germany . |
| 301910 | 5/1929 | United Kingdom ............ 100/162 B |

Primary Examiner—Edgar S. Burr
Assistant Examiner—Stephen R. Funk
Attorney, Agent, or Firm—Jones, Tullar & Cooper

[57] ABSTRACT

A paper guide cylinder utilizes an outer cylinder shell and an interior dynamically balanced cast body. A pair of axle journals are formed at the ends of the cylinder body. At least one of the axle journals is adjustably supported concentrically with a bearing journal that is formed with the outer cylinder shell.

7 Claims, 4 Drawing Sheets

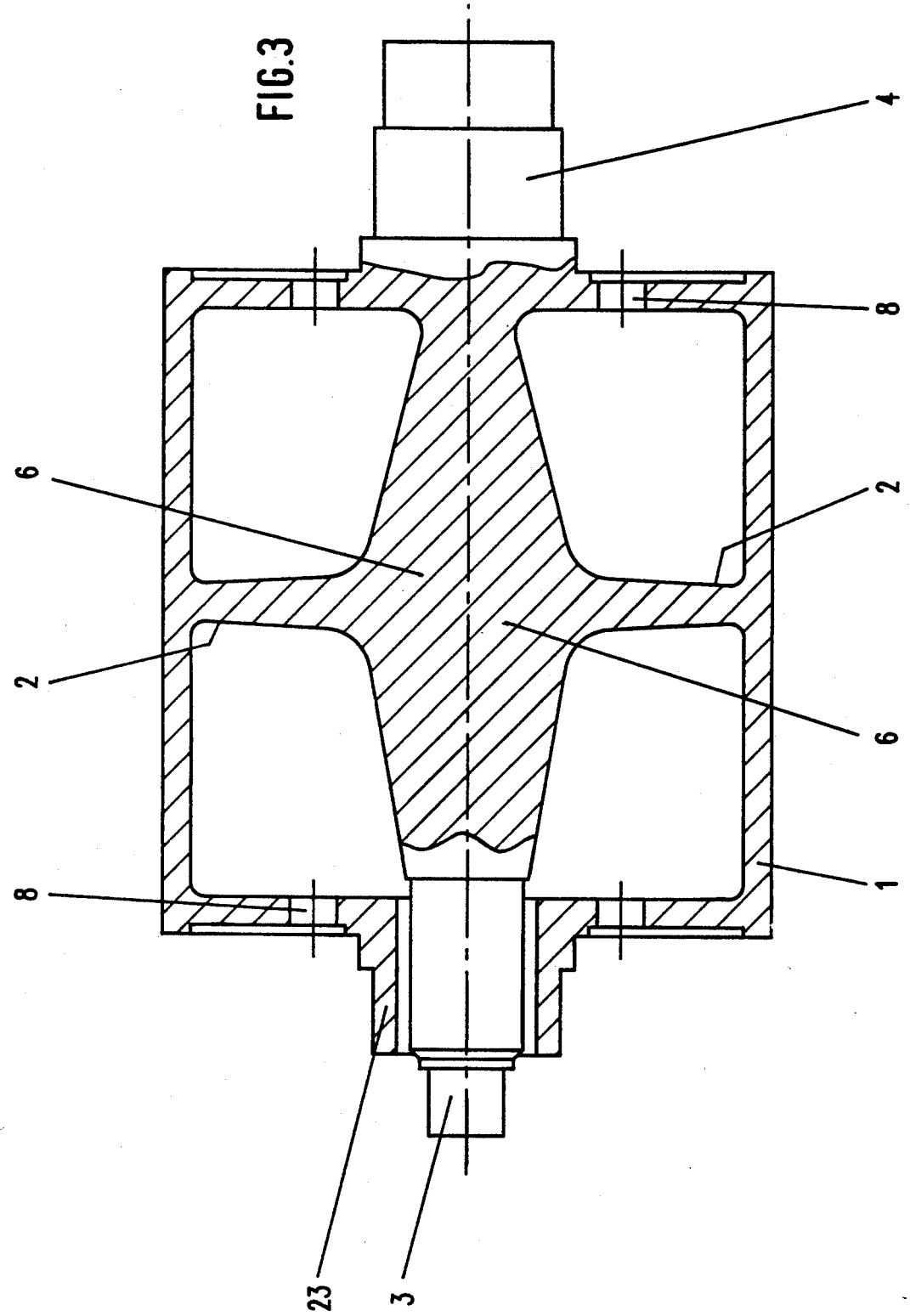

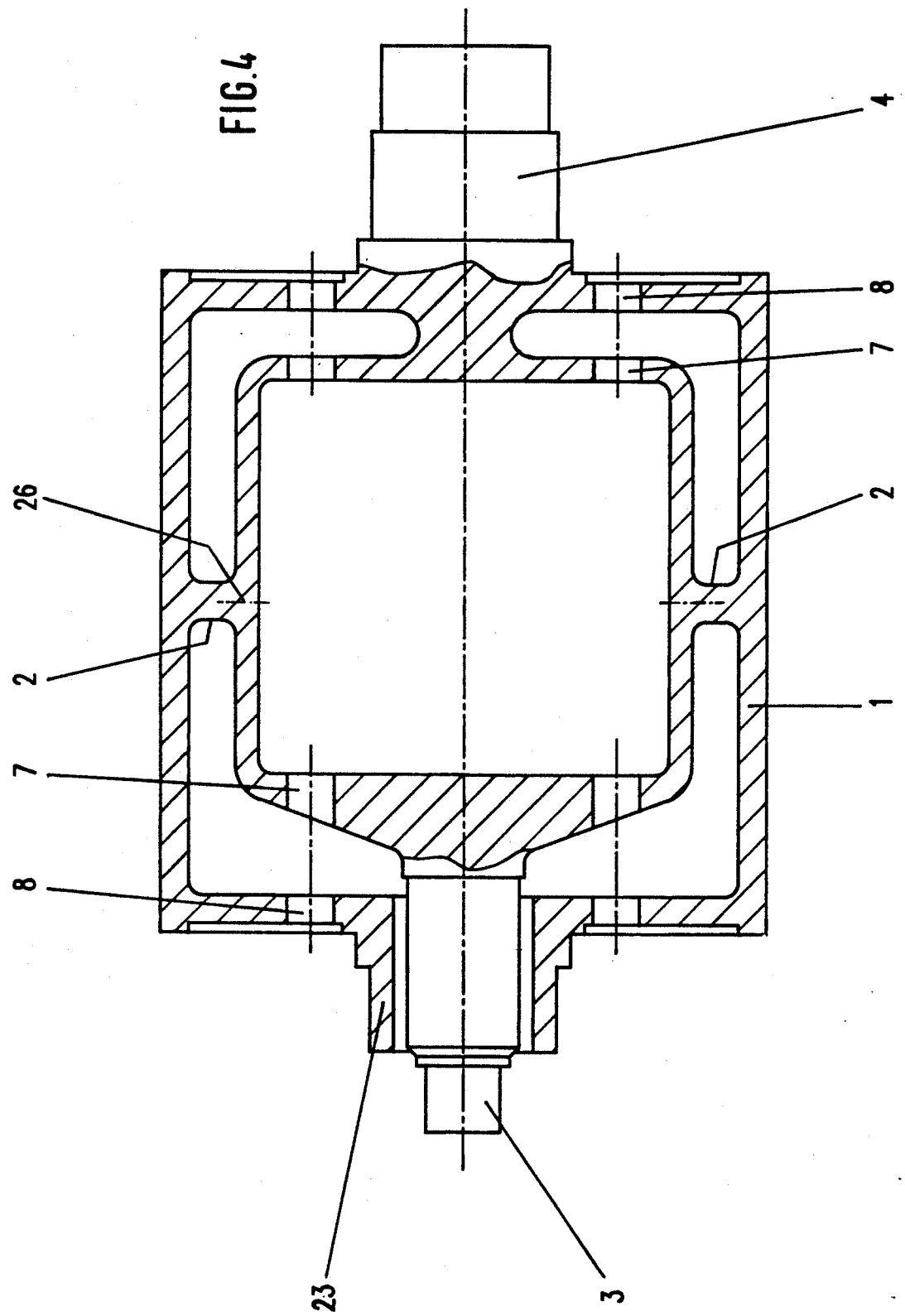

HOLLOW PAPER GUIDE CYLINDER WITH INTERNAL REINFORCEMENT

FIELD OF THE INVENTION

The present invention is directed generally to a paper guide cylinder. More particularly, the present invention is directed to a paper guide cylinder for a sheet-fed rotary printing press. Most specifically, the present invention is directed to a paper guide cylinder for a sheet-fed rotary printing press which has a hollow, internally reinforced body. The cylinder body includes an outer shell that is provided with suitable cutouts or channels for sheet grippers. Alternatively, suitable crossbars can form the shell surface of the cylinder body. Internal reinforcing members are used to rigidify the body shell and to prevent it from deforming. The cylinder is rotatably supported and driven through axle journals. At least one of the axle journals is adjustably positioned within a generally concentric pipe or tube-shaped bearing journal.

DESCRIPTION OF THE PRIOR ART

It is generally known in the prior art that registration errors can occur with paper guide cylinders of sheet-fed rotary printing presses. One reason for these errors is the deformation of the paper because of pressure and moisture. Deformations of the front edge of the paper sheets are also caused by warping of the paper guide cylinders within a range of 5 to 10 $\mu$m. The size of the warp of the cylinders appears as a registration error twice as large. The plurality of transfer points in multicolor presses, with there often being 6 to 10 of such sheet transfer points, can cause concave deformations of the front edge line of sheets in the range of 0.1 $\mu$m. If a sheet to be transported is gripped on a first edge by the sheet gripper of a first paper guide cylinder and passed on horizontally, for example depending on the configuration of the printing system, after approximately one-half of a turn to the sheet grippers of the following paper guide cylinder, and if the paper guide cylinder is bent downward by gravity by, for example 5 $\mu$m, the sheet gripper device deforms in the opposite direction after one-half turn.

Bending is caused not only by gravity, but also by the drive components of the geared wheels and forces in the printing area. This deformation of the paper guide cylinder during its rotation causes the sheet grippers to also be bent or deformed so that the registration errors increase with an increasing number of sheet transfer points.

One prior art attempt to counteract the registration errors that are a result of paper guide cylinder deformations is shown in German published, unexamined patent application No. DE-OS 38 23 846. In this publication, there is shown a cylinder in the printing system of sheet-fed rotary printing presses. Bending of the cylinder is counteracted by structuring the cylinder as a hollow body in which a central shaft is seated in bearings on at least three points within the hollow cylinder body. The shaft is eccentric at the central one of the bearings so that it can act as a brace for the shaft and cylinder.

A limitation of this prior art cylinder is that three additional bearing points in the cylinder must be formed. The hollow cylinder body must also be provided with three precisely aligned bores for receipt of the three bearings. Additionally, there is no provision for making adjustments to the internal bracing of this prior art device.

It will be apparent that a need exists for a paper guide cylinder which overcomes the limitations of the prior art devices and which is able to counteract bending and deflection. The paper guide cylinder in accordance with the present invention provides such a device and is a significant improvement over the prior art devices.

SUMMARY OF THE INVENTION

It is an object of the present invention to provide a paper guide cylinder.

Another object of the present invention is to provide a paper guide cylinder for a sheet-fed rotary printing press.

A further object of the present invention is to provide a paper guide cylinder which counteracts cylinder bending.

Yet another object of the present invention is to provide a paper guide cylinder which has a hollow, reinforced body.

Still a further object of the present invention is to provide a paper guide cylinder having an outer body shell and an interior dynamically balanced body.

Even yet another object of the present invention is to provide a paper guide cylinder having an adjustment means for the cylinder shaft.

As will be discussed in greater detail in the description of the preferred embodiments which are set forth subsequently, the paper guide cylinder in accordance with the present invention utilizes a dynamically balanced body which is disposed in the interior of the hollow cylinder shell to act as a shaft. This dynamically balanced cylinder body is connected to the cylinder shell on a first side or end by an axle journal, in the center by bars or a circular or ring-shaped surface centered with the shell surface or the outer body, and at a second side or end by an axle journal that axially extends outward on the other side through a pipe-shaped bearing journal, and which is provided with a centrally located bearing which can be eccentrically set by means of an adjustment device. The paper guide cylinder thus utilizes an outer shell and an inner dynamically balanced body to provide a relatively rigid cylinder which is resistant to bending.

Bending of paper sheet-guiding cylinders of different sizes, which can be caused by their own weight, by compressive strain or the drive forces, are prevented to a great extent by the construction of the cylinder in accordance with the present invention. If small bending forces should nevertheless occur, they can be equalized by means of the adjustment device through the axle journal which is centrally seated in the pipe-shaped bearing journal. In this way, it is possible to make a correction of the front edges of the sheets in a concave or convex direction, either with the press running or after a press run. The use of two pipe-shaped bearing journals makes it possible to brace the two axle journals centrally seated therein by means of adjusting devices provided on both sides, which can be advantageous with long, slim rollers.

The paper guide roller in accordance with the present invention provides a roller which is resistant to bending and deformations and which overcomes the limitations of the prior art devices. The paper guide roller of the present invention is thus a substantial advance in the art.

BRIEF DESCRIPTION OF THE DRAWINGS

While the novel features of the paper guide cylinder in accordance with the present invention are set forth with particularity in the appended claims, a full and complete understanding of the invention ma be had by referring to the detailed description of the preferred embodiments, which are presented subsequently, and as illustrated in the accompanying drawings in which:

FIG. 3 is a longitudinal cross-sectional view of a second preferred embodiment of a paper guide cylinder; and FIG. 4 is a longitudinal cross-sectional view of a third preferred embodiment of a paper guide cylinder in accordance with the present invention.

DESCRIPTION OF THE PREFERRED EMBODIMENTS

Figure 1:
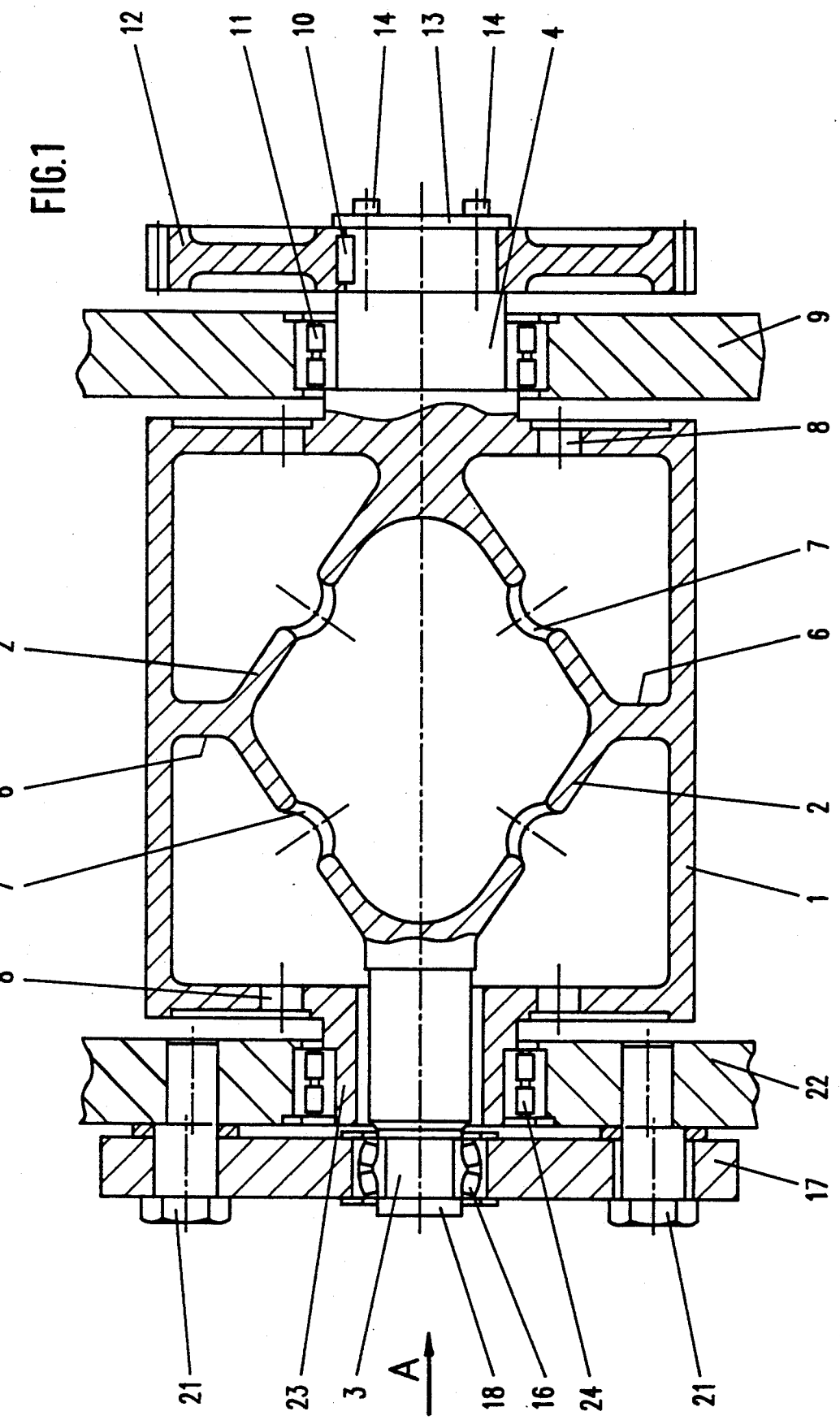
FIG. 1 is a longitudinal, cross-sectional view of a first preferred embodiment of a paper guide cylinder in accordance with the present invention.

Referring initially to FIG. 1 there may be seen a first preferred embodiment of a paper guide cylinder in accordance with the present invention. As may be seen in FIG. 1, the paper guide cylinder consists of a one-piece cast body with an outer hollow body shell 1 and having bars 2 in its interior. Each of these interior reinforcing bars 2 extends from the axle journals 3 and 4, which are disposed at the axial center of the paper guide cylinder in relation to the shell surface of the cylinder, in an axial longitudinal direction towards the center of the cylinder. In the first preferred embodiment the interior reinforcing body or bars 2 have the shape of two hollow double cones, which are brought together with their ring-shaped faces 6 in the longitudinal center of the cylinder. The bars 2 have cutouts 7 and core openings 8 for fixing the mold core of the cylinder and to remove the molding sand.

As seen in FIG. 1, the axle journal 4 is formed integrally with a first end wall of the outer body shell and is embodied as a drive journal and is seated in a bearing 11 disposed in a frame 9. Outside of the frame 9, a toothed gear wheel 12 is connected to the drive axle journal 4 and is fixed against relative rotation with respect to journal 4 by means of a key 10. A cover disk 13 is centered on the axle journal 4 and fastened by means of screws 14. The gear wheel 12 will be understood to be in gear drive engagement with the main press drive through a suitable gear train that is not specifically shown.

The axle journal 3 which is at the end of the paper guide cylinder opposite to the gear drive 12, is an adjustable journal which extends through an opening in a second end wall of the outer body shell and which allows the paper guide cylinder to be adjusted to compensate for deflections and misalignments. Axle journal 3 is supported in a bearing 16 that is fastened to a flange 17. The end of the axle journal 3 is covered by a cover plate 18. The flange 17 has spaced elongated holes 19, as may be seen in FIGS. 1 and 2 which receive adjustment cams 21. These adjustment cams 21 are received in the side frame 22 and are rotatable and removable from the frame 22. Rotation of the adjustment cams 21 will shift the position of flange 17 and thus the location of the adjustable axle journal 3.

As may be seen in FIG. 1, adjustable axle journal 3 is located concentrically within a generally pipe-shaped or tube-shaped bearing journal 23. This bearing journal 23 is seated in a bearing 24 that is supported in the side frame 22. Thus the drive axle journal 4 and the pipe-shaped bearing journal 23 are fixed while the adjustable axle journal 3 is capable of limited movement.

Figure 2:
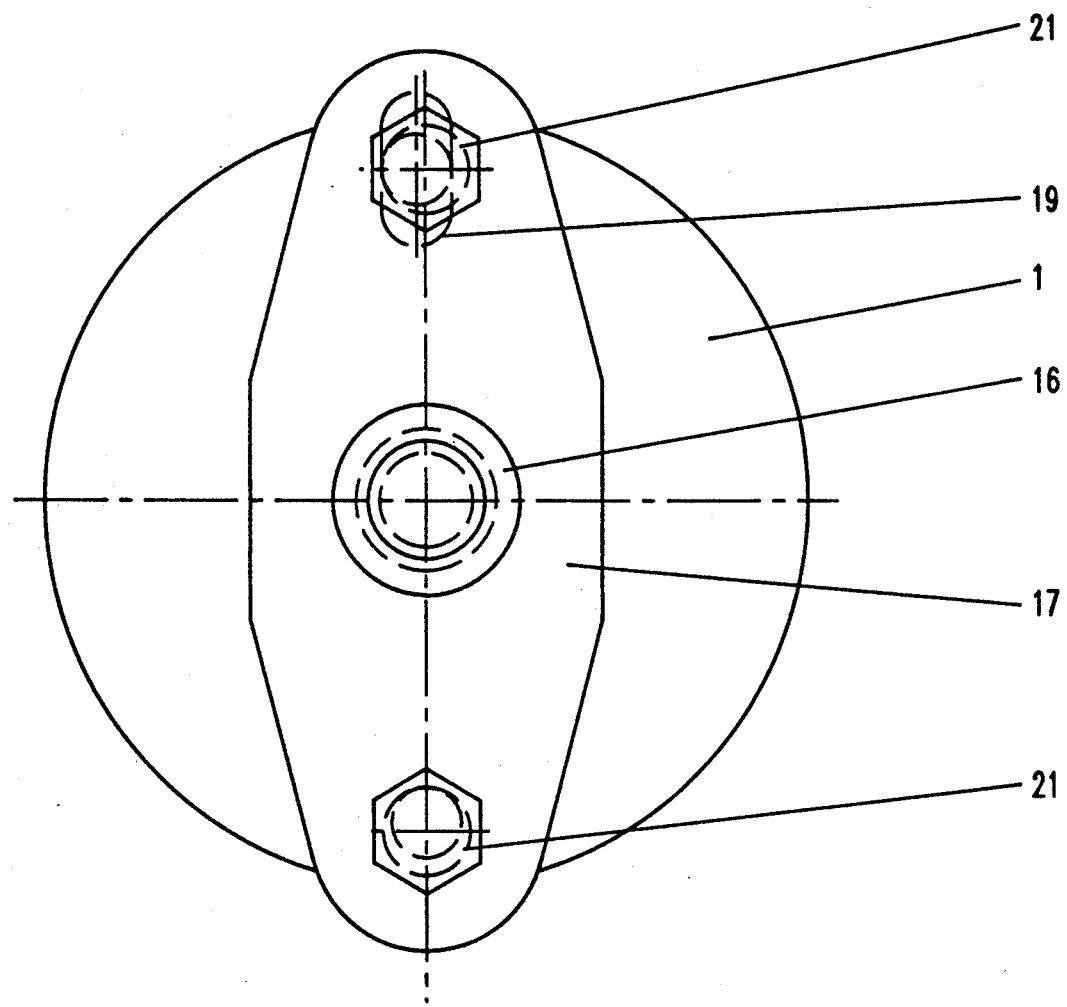
FIG. 2 is an end view of the paper guide cylinder of FIG. 1 taken in the direction indicated by arrow A in FIG. 1.

In the first preferred embodiment of the paper guide cylinder that is depicted in FIGS. 1 and 2, the various sheet gripper devices which are carried by the outer cylinder body 1 are not shown since they form no part of the invention. Also, as was discussed above, it will be understood that the rotation of one or both of the adjustment cams 21 will serve to move the flange 17 and thus to move the adjustable axle journal 3 with respect to the bearing journal 23. Such relative movement is used to adjust the paper guide cylinder to compensate for deformations or deflections.

Turning now to FIG. 3, there may be seen a second preferred embodiment of the paper guide cylinder of the present invention. In this second embodiment, as well as in the third embodiment which will be discussed shortly, the bearings and adjustment means have been omitted for reasons of clarity. It will be understood that they are the same as shown in FIGS. 1 and 2.

In this second preferred embodiment, the paper guide cylinder has a one piece, dynamically balanced interior reinforcing body which extends axially inwardly from the outer axle journals 3 and 4 toward the longitudinal center of the cylinder. This cylinder interior reinforcing body is generally in the shape of two truncated cones whose bases abut each other so that their annular peripheral edges 6 are in contact and extend radially outwardly. The outer periphery of the circular edges 6 are securely attached to the inner surface of the cylinder shell 1 by connecting bars 2. These connecting bars 2 may have a plurality of weight reducing cut-outs that are not specifically shown. The two end faces of the cylinder shell or outer body 1 have a plurality of core openings 8 to allow casting of the cylinder and removal of the casting sand.

This second preferred embodiment of the cylinder paper guide of the present invention can be used quite advantageously where a simple embodiment of the casting core is important, or in small cylinders where the material accumulation of the axle body is without importance. It is also possible to weld the cylinder together from individual parts. These, individual parts are the dynamically balanced cylinder interior reinforcing body, a punched disk for the bar 2, as well as two further punched disks which are disposed at the ends and welded together with the shell surface A pipe-shaped bearing journal 23, which is oriented axially towards the outside, is welded to at least one end of the paper guide cylinder body.

Referring now to FIG. 4, there may be seen a third preferred embodiment of a paper guide cylinder in accordance with the present invention. As was the situation with the second preferred embodiment, the bearings and the adjustment assembly are not shown. The third preferred embodiment of the paper guide cylinder also utilizes a dynamically balanced cylinder interior reinforcing body which is a one piece casting. This cast interior reinforcing body extends axially inwardly from the two spaced axle journals 3 and 4 and is in the form generally of hollow cups whose edges or rims abut each other generally at 26. The cup edges 26 are securely attached to the inner surface of the cylinder shell 1 by connecting bars 2 which, in a manner similar to that discussed with respect to the second preferred embodiment may be punched disks 2. The two end faces of the cylinder shell have core openings 8 and the bottoms of the two cups that form the dynamically balanced cast cylinder interior reinforcing body have a plurality of openings 7.

This third preferred embodiment of the paper guide cylinder is particularly advantageous for use with elongated cylinders having a relatively small diameter with respect to their length. When particularly long or slim paper guide cylinders are being utilized it is within the scope of the present invention to place the axle journal 4 within a pipe-shaped bearing journal 23 on the driven side of the paper guide cylinder and to brace and support it with an adjusting device in a manner the same as that discussed with respect to axle journal 4 and as depicted in FIG. 1.

While preferred embodiments of a paper guide cylinder in accordance with the present invention has been set forth fully and completely hereinabove, it will be apparent to one of skill in the art that a number of changes in, for example the type of grippers carried by the cylinder, the type of gear drive means, the type of bearings used and the like may be made without departing from the true spirit and scope of the present invention which is accordingly to be limited only by the following claims.

What is claimed is:

1. A paper guide cylinder for a sheet-fed rotary printing press, said paper guide cylinder comprising:
   a hollow outer cylinder shell supported for rotation about a longitudinal rotational axis;
   a dynamically balanced cylinder interior reinforcing body disposed in an interior portion of said cylinder shell;
   a drive axle journal formed at a first end of said cylinder interior reinforcing body and integral with a first end wall of said outer cylinder shell;
   an adjusting axle journal formed at a second end of said cylinder interior reinforcing body and extending through an opening in a second end wall of said outer cylinder shell;
   means securing a central portion of said cylinder interior reinforcing body to said cylinder shell;
   a first pipe-shaped bearing journal secured to said second end wall of said cylinder shell, said adjustable axle journal passing through said bearing journal, said bearing journal being concentric with said adjustable axle journal; and
   means to adjust said adjustable axle journal with respect to said bearing journal.

2. The paper guide cylinder of claim 1 wherein said cylinder interior reinforcing body is shaped as two hollow cones having circular bases, said circular bases being joined to each other and to said cylinder shell at said central portion of said cylinder body.

3. The paper guide cylinder of claim 1 wherein said cylinder interior reinforcing body is shaped as two cones having circular bases, said circular bases being joined to each other and to said cylinder shell at said central portion of said cylinder body.

4. The paper guide cylinder of claim 1 wherein said cylinder interior reinforcing body is shaped as two hollow cups having circular cup edges, said circular cup edges being joined to each other and to said cylinder shell at said central portion of said cylinder body.

5. The paper guide cylinder of claim 1 wherein said means to adjust said adjustable axle journal includes a flange, said flange supporting a bearing for the receipt of an end of said adjustable axis journal, and further includes adjustment cams, said flange being supported for movement relative to said pipe shaped bearing journal by said adjustment cams.

6. The paper guide cylinder of claim 1 further including core openings in said cylinder shell and cutouts in said cylinder body.

7. The paper guide cylinder of claim 1 wherein said hollow cylinder shell and said cylinder body are a one piece casting.

* * * * *